US012671651B2

(12) United States Patent
Haridas

(10) Patent No.: US 12,671,651 B2
(45) Date of Patent: Jun. 30, 2026

(54) METHOD AND SYSTEM FOR FOUR-PATH PARALLEL REDUNDANCY PROTOCOL IN CONNECTED NETWORKS

(71) Applicant: Honeywell International Inc., Charlotte, NC (US)

(72) Inventor: Harshal S. Haridas, Jamison, PA (US)

(73) Assignee: Honeywell International Inc., Charlotte, NC (US)

( * ) Notice: Subject to any disclaimer, the term of this patent is extended or adjusted under 35 U.S.C. 154(b) by 24 days.

(21) Appl. No.: 18/388,946

(22) Filed: Nov. 13, 2023

(65) Prior Publication Data

US 2025/0158920 A1     May 15, 2025

(51) Int. Cl.
H04L 45/28          (2022.01)
H04L 45/00          (2022.01)
(52) U.S. Cl.
CPC .............. H04L 45/28 (2013.01); H04L 45/22 (2013.01); H04L 45/566 (2013.01)
(58) Field of Classification Search
CPC ........ H04L 45/28; H04L 45/22; H04L 45/566
See application file for complete search history.

(56) References Cited

U.S. PATENT DOCUMENTS

| | | | | | |
|---|---|---|---|---|---|
| 6,831,898 | B1 * | 12/2004 | Edsall | ..................... | H04L 45/24 |
| | | | | | 370/256 |
| 9,379,993 | B1 * | 6/2016 | Qaddoura | ............. | H04L 47/528 |
| 9,473,995 | B1 * | 10/2016 | Ramamurthy | ........ | H04W 76/34 |

| | | | | | |
|---|---|---|---|---|---|
| 9,853,885 | B1 * | 12/2017 | Tillotson | ............... | H04L 45/306 |
| 10,298,726 | B2 | 5/2019 | Müeller et al. | | |
| 10,355,976 | B2 | 7/2019 | Sahlqvist | | |
| 11,303,568 | B1 * | 4/2022 | Haridas | ................. | H04L 45/745 |
| 11,336,564 | B1 | 5/2022 | Mullis et al. | | |
| 2017/0195260 | A1 | 7/2017 | Ma | | |
| 2018/0026875 | A1 * | 1/2018 | Gilson | .................... | H04L 45/24 |
| | | | | | 370/389 |

(Continued)

FOREIGN PATENT DOCUMENTS

| | | | |
|---|---|---|---|
| CN | 109005088 | A | 12/2018 |
| CN | 111447186 | A | 7/2020 |

(Continued)

OTHER PUBLICATIONS

Search Report for 24210796.9 dated Apr. 2, 2025.

*Primary Examiner* — Scott B Christensen
*Assistant Examiner* — Zonghua Du
(74) *Attorney, Agent, or Firm* — Paschall & Associates, LLC; James C. Paschall; Anthony Miologos

(57)          ABSTRACT

The data communication system and method comprises at least a first network and a second network. A first node interface is connected to a second node interface over the first network and to a second node interface over the second network. The data communication system is configured to send data packaged in a data packet frame and to duplicate the data packet frame into a plurality of alternate data packet frames. The data communication system sends the data packet frame and duplicated data packet frames from the first node interface to the second node interface via the first network using a first network address and sends the data packet frame and the duplicated data packet frames from the first node interface to the second node interface via the second network using a second network address.

18 Claims, 6 Drawing Sheets

(56) References Cited

U.S. PATENT DOCUMENTS

| | | | |
|---|---|---|---|
| 2018/0083737 A1* | 3/2018 | Mendes da Silva ...... | H04L 1/22 |
| 2022/0158919 A1* | 5/2022 | Zou ..................... | H04L 43/0817 |
| 2023/0061491 A1* | 3/2023 | Mullis ................... | H04L 49/351 |
| 2023/0097452 A1 | 3/2023 | Nguyen et al. | |
| 2024/0022506 A1* | 1/2024 | Mitchell ............. | H04L 12/4645 |

FOREIGN PATENT DOCUMENTS

| | | | |
|---|---|---|---|
| EP | 4072104 A1 | 10/2022 | |
| WO | 2016097459 A1 | 6/2016 | |

* cited by examiner

400

| Identifier | Network 1 MAC Address | Network 2 MAC Address |
|------------|------------------------|------------------------|
| Node 1 | A1 | A1 |
| Node 2 | A2 | A2 |

402

| Dest=A2 | Source=A1 | Data | PRP Trailer = Seq#, Network 1 |
|---------|-----------|------|-------------------------------|

404

| Dest=B2 | Source=B1 | Data | PRP Trailer = Seq#, Network 2 |
|---------|-----------|------|-------------------------------|

600

| Identifier | Network 1 MAC Address | Network 2 MAC Address |
|------------|----------------------|----------------------|
| Node 1 | A1 | B1 |
| Node 2 | A2 | B2 |

602

| Dest=A2 | Source=A1 | Data | PRP Trailer = Seq#, Network 1 |
|---------|-----------|------|-------------------------------|

604

| Dest=B2 | Source=B1 | Data | PRP Trailer = Seq#, Network 2 |
|---------|-----------|------|-------------------------------|

606

| Dest=A2 | Source=B1 | Data | PRP Trailer = Seq#, Network 1 |
|---------|-----------|------|-------------------------------|

608

| Dest=B2 | Source=A1 | Data | PRP Trailer = Seq#, Network 2 |
|---------|-----------|------|-------------------------------|

METHOD AND SYSTEM FOR FOUR-PATH PARALLEL REDUNDANCY PROTOCOL IN CONNECTED NETWORKS

TECHNICAL FIELD

This disclosure relates generally to industrial process control and automation systems. More specifically, this disclosure relates to methods and systems for facilitating a four-path parallel redundancy protocol in industrial process control and automation system connected networks.

BACKGROUND

Industrial process control and automation systems are routinely used to automate large and complex industrial processes. These types of systems typically include sensors, actuators, controllers and other intelligent electronic devices for supervisory control and data acquisition. The intelligent electronic devices in such systems are interconnected and communicate through a LAN (local area network) or WAN. In such industrial process control and automation systems the architecture may include gateways that are connected to the sensors and actuators used in the automation system that are not directly connected to the controller. High availability applications operating within a LAN or WAN controlling and supervising process control and automation system expect networks to have access to all intelligent electronic devices in the network to avoid communication disruption. Such as for example, high-speed redundancy rings or Parallel Redundancy Protocol (PRP) network systems. However, these high availability applications continue to be susceptible to failures in multiple fault situations.

PRP network systems use two independent networks to communicate supervisory control signals and data between the devices or nodes of a network. PRP duplicates the data frames to be transmitted, adds a redundancy control trailer (RCT) with a unique sequence number to the end each of a standard communication data packet. Such as, an IP (Internet protocol) data packet for each PRP frame and sends both PRP frames through two independent LANs or WANs having a similar network topology. The receiver identifies the frames by the RCT and source MAC (media access control) address, accepts and processes the first-arrived PRP frame, and discards the second PRP frame if it ever arrives. Since the RCT is added at the end of standard data packet as part of the PRP frame, the RCT can be ignored by non-PRP compatible equipment. This approach ensures that PRP works with both PRP compatible and non-compatible equipment as long as the transmitter and receiver ends are PRP compatible.

Many industrial process control and automation system customers require vendors to ensure that the two PRP networks are independent with no inter-connections between them. However, a failure condition exists when an inadvertent physical connection is made between these independent networks. Such as cross connecting a cable between the two networks. Such a connection would result in critical and catastrophic loss of communication between the devices and nodes of the industrial control system causing plant shutdowns or safety incidents. The loss of communication is primarily due to the PRP design which uses the same MAC addresses for packets on each of the independent networks. Although, PRP has a built-in design to include network information to which a packet belongs to, managed switching equipment will see the same MAC address from two different ports and report MAC flapping errors. This results in spanning tree recovery procedures incorrectly being administered.

The issues with standard PRP are multifold in nature. A connected PRP network may be employed to provide additional resilience compared to standard PRP. However, while a connected PRP network may provide additional resilience compared to standard PRP, connected PRP networks may not withstand dual failures in the network.

Therefore, there is a need for an improved PRP network that may provide additional resilience and can withstand dual failures in the network to ensure communication of supervisory control signals and data between the devices or nodes of a network.

SUMMARY

This disclosure relates to a method and system for facilitating a parallel redundancy protocol in industrial process control and automation systems.

In a first embodiment, a data communication system is provided configured to establish independent network paths through the data communication system. The data communication system comprises at least a first network and a second network, including a first node interface connected to a second node interface over the first network and to the second node interface over the second network. The data communication system duplicates a data packet frame into a plurality of alternate data packet frames. The data communication system sends the data packet frame and the alternated data packet frames from the first node interface to the second node interface via the first network using a first network address and the data packet frame and the plurality of alternated data packet frames from the first node interface to the second node interface via the second network using a second network address.

In a second embodiment, a method establishes independent network paths through a data communication system, the data communication system comprising at least a first network and a second network. The method connects a first node interface to a second node interface over the first network and further connects the first node interface to the second node interface over the second network. The method configures the first node interface to send a data packet frame to the second node interface via the first network using a first network address and configures the first node interface a data packet frame to the second node interface via the second network using a second network address, wherein the first node interface duplicates the data packet frame into a plurality of alternate data packet frames.

In a third embodiment, a non-transitory computer readable medium containing instructions that when executed cause at least one processing device to connect a first node interface to a second node interface over a first network and to connect the first node interface to a second node interface over a second network. The first node interface is instructed to send a data packet frame to the second node interface via the first network using a first network address and to send a data packet frame to the second node interface via the second network using a second network address, wherein the first node interface duplicates the data packet frame into a plurality of alternate data packet frames.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

The figures discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
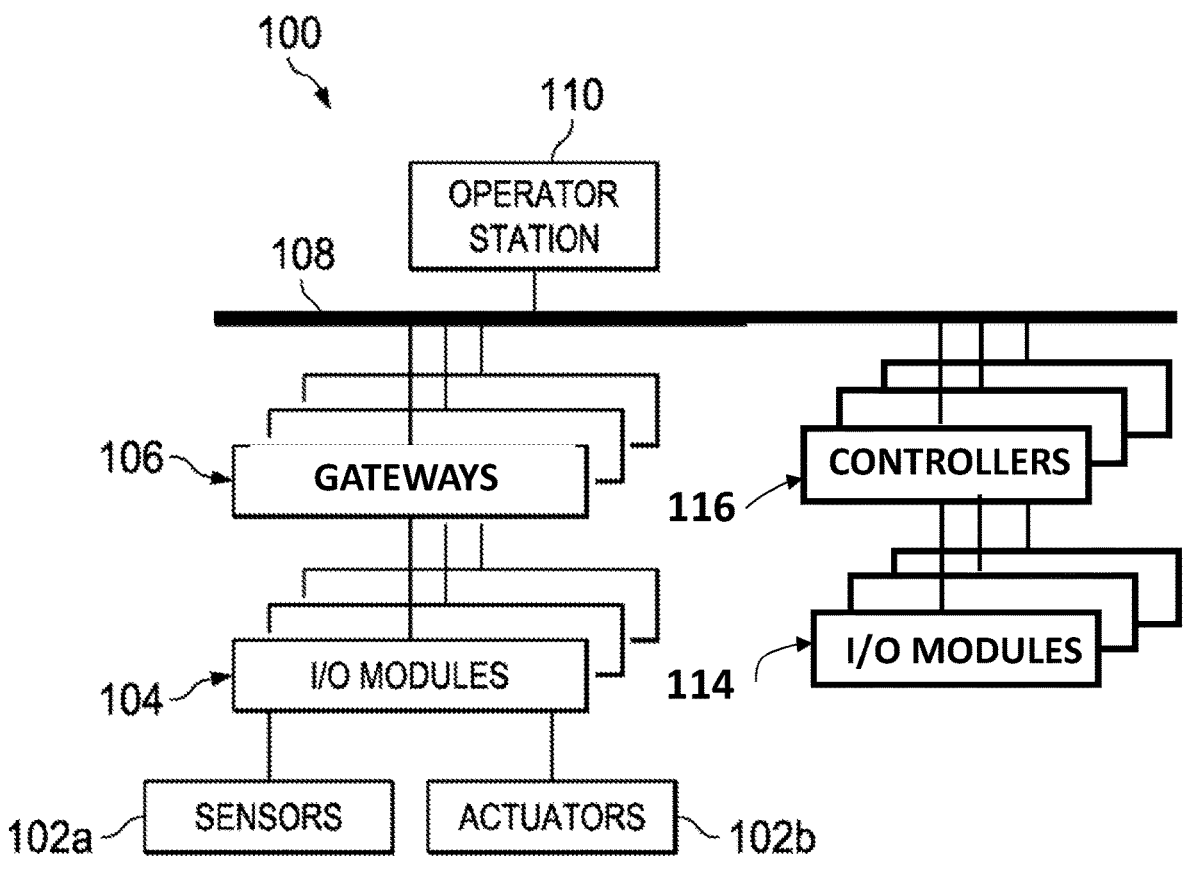
FIG. 1 illustrates an example industrial process control and automation system according to this disclosure.

FIG. 1 illustrates a portion of an example industrial process control and automation system 100 according to this disclosure. As shown in FIG. 1, the system 100 includes various components that facilitate production or processing of at least one product or other material. For instance, the system 100 can be used to facilitate control or monitoring of components in one or multiple industrial plants. Each plant represents one or more processing facilities (or one or more portions thereof), such as one or more manufacturing facilities for producing at least one product or other material. In general, each plant may implement one or more industrial processes and can individually or collectively be referred to as a process system. A process system generally represents any system or portion thereof configured to process one or more products or other materials or energy in different forms in some manner.

In the example shown in FIG. 1, the system 100 includes one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. Each of the sensors 102a includes any suitable structure for measuring one or more characteristics in a process system. Each of the actuators 102b includes any suitable structure for operating on or affecting one or more conditions in a process system.

At least one input/output (I/O) module 104 is coupled to the sensors 102a and actuators 102b. The I/O modules 104 facilitate interaction with the sensors 102a, actuators 102b, or other field devices. For example, an I/O module 104 could be used to receive one or more analog inputs (AIs), digital inputs (DIs), digital input sequences of events (DISOEs), or pulse accumulator inputs (PIs) or to provide one or more analog outputs (AOs) or digital outputs (DOS). Each I/O module 104 includes any suitable structure(s) for receiving one or more input signals from or providing one or more output signals to one or more field devices. Depending on the implementation, an I/O module 104 could include fixed number(s) and type(s) of inputs or outputs or reconfigurable inputs or outputs. In the exemplary system of FIG. 1 I/O modules are connected to gateways 106 via network 108. The gateways 106 receive the supervisory control information from remotely located controllers 116. The gateways 106 serve as an entry and exit point for a network node. Control information as all data must pass through or communicate with the gateway prior to being routed from the node. For example, control information from controllers 116 can be sent to the actuators 102b from controllers 116 through one or more gateways 106. Data from the sensors 102a is communicated to one or more controllers 116 through one or more gateways 106.

For example, a first set of controllers 116 may use measurements from one or more sensors 102a to control the operation of one or more actuators 102b. These controllers 116 could interact with the sensors 102a, actuators 102b, and other field devices via the I/O module(s) 104. The controllers 116 may be coupled to the I/O module(s) 104 via Ethernet, backplane communications, serial communications, or the like. A second set of controllers 116 could be used to optimize the control logic or other operations performed by the first set of controllers. A third set of controllers 106 could be used to perform additional functions.

The controllers 116 can be used in the system 100 to perform various functions in order to control one or more industrial processes. For example, a first set of controllers 116, that operate as a first network node may use measurements from one or more sensors 102b sent from gateways 106 operating as a second and separated network node to control the operation of one or more actuators 102b. These controllers 116 could interact with the sensors 102a, actuators 102b, and other field devices via the gateways 106 and I/O module(s) 104. Additionally, controllers 116 can also communicate to sensors and actuators (not shown) that can be connected to I/O modules 114 in the first network node. The controllers 116 may be coupled to the I/O module(s) 104 via Ethernet, backplane communications, serial communications, or the like. A second set of controllers 116 could be used to optimize the control logic or other operations performed by the first set of controllers. A third set of controllers 116 could be used to perform additional functions.

Controllers 116 are often arranged hierarchically in a system. For example, different controllers 116 could be used to control individual actuators, collections of actuators forming machines, collections of machines forming units, collections of units forming plants, and collections of plants forming an enterprise, either directly connected in their network node or to a different network node via a gateway 106. A particular example of a hierarchical arrangement of controllers 116 is defined as the "Purdue" model of process control. The controllers 116 in different hierarchical levels can communicate via one or more networks 108 and associated switches, firewalls, and other components.

Each controller 116 includes any suitable structure for controlling one or more aspects of an industrial process. At least some of the controllers 106 could, for example, represent proportional-integral-derivative (PID) controllers or multivariable controllers, such as Robust Multivariable Predictive Control Technology (RMPCT) controllers or other types of controllers implementing model predictive control (MPC) or other advanced predictive control. As a particular example, each controller 116 could represent a computing device running a real-time operating system, a MICROSOFT WINDOWS operating system, or other operating system. Operator access to and interaction with the controllers 116 and other components of the system 100 can occur via various operator stations 110.

Each operator station 110 could be used to provide information to an operator and receive information from an operator. For example, each operator station 110 could provide information identifying a current state of an industrial process to an operator, such as values of various process variables and warnings, alarms, or other states associated with the industrial process. Each operator station 110 could also receive information affecting how the industrial process is controlled, such as by receiving setpoints for process variables controlled by the controllers 106 or other information that alters or affects how the controllers 106 control the industrial process. Each operator station 110 includes any suitable structure for displaying information to and interacting with an operator.

This represents a brief description of one type of industrial process control and automation system that may be used to manufacture or process one or more materials. Additional details regarding industrial process control and automation systems are well-known in the art and are not needed for an understanding of this disclosure. Also, industrial process control and automation systems are highly configurable and can be configured in any suitable manner according to particular needs.

Although FIG. 1 illustrates a portion of one example industrial process control and automation system 100, various changes may be made to FIG. 1. For example, various components in FIG. 1 could be combined, further subdivided, rearranged, or omitted, and additional components could be added according to particular needs. Also, while FIG. 1 illustrates one example operational environment in which redundant controllers could be used, this functionality could be used in any other suitable system.

Figure 2:
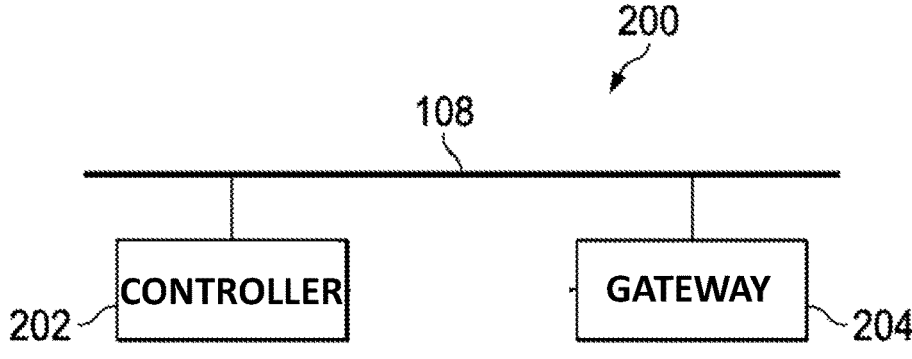
FIG. 2 illustrates an example control group consisting of a controller in a first network node communicating to a gateway in a second network node according to this disclosure.

FIG. 2 illustrates an example control group 200 consisting of a controller in a first network node communicating to a gateway in a second network node along one or more networks 108. For ease of explanation, the control group 200 is described as being used in the industrial process control and automation system 100 of FIG. 1. However, the control group 200 could be used in any other suitable system. The example, control group 200 operates at Level 1 of the Purdue model, and among other things, the example control group 200 may use the measurements from the one or more sensors 102a to control the operation of one or more actuators 102b.

As shown in FIG. 2, the control group 200 includes a controller 202 and a gateway 204. The controller 202 may represent, or be represented by, various ones of the controllers 116 of FIG. 1. The gateway 204 may represent, or be represented by, various ones of the 106 of FIG. 1. The controllers 202 and gateways 204 are connected to the one or more networks 108, such as FTE (fault tolerant ethernet), IEC-61850, Ethernet/IP, or MODBUS/TCP networks. Controllers 202 could communicate with the sensors and implement control logic for controlling the actuators within their own network node. Controllers 202 could also communicate with gateways 106 and the sensors 102a and implement control logic for controlling the actuators 102b within the second network node of the gateway 204.

In an embodiment of the present disclosure, a private network facilitates communication between the controllers 202 and gateways 204. The private network can transport supervisory control and data between the controllers 202 and gateways 204, thereby allowing controllers 202 to access and control the sensors and actuators of the second network node.

The private network includes any suitable structure for transporting data between networked devices such as a parallel redundant protocol (PRP) network operating under IEC standard 62439-3. For example, each controller 202 could be configured as a node communicating between the gateways 204 using two independent PRP networks. Supervisory control and process data can be transmitted and received along the two independent networks between the controllers 202 and gateways 204. Each controller 202 includes any suitable structure configured to perform control operations in an industrial process control and automation system.

Although FIG. 2 illustrates an example of a controller group 200 having redundant process controllers for industrial control networks, various changes may be made to FIG. 2. For example, a controller group 200 could include more or fewer controllers. Also, any suitable number and configuration of other network devices could be used to interconnect the controllers in a controller group or a controller node.

Figures 3, 4, 4A, 4B:
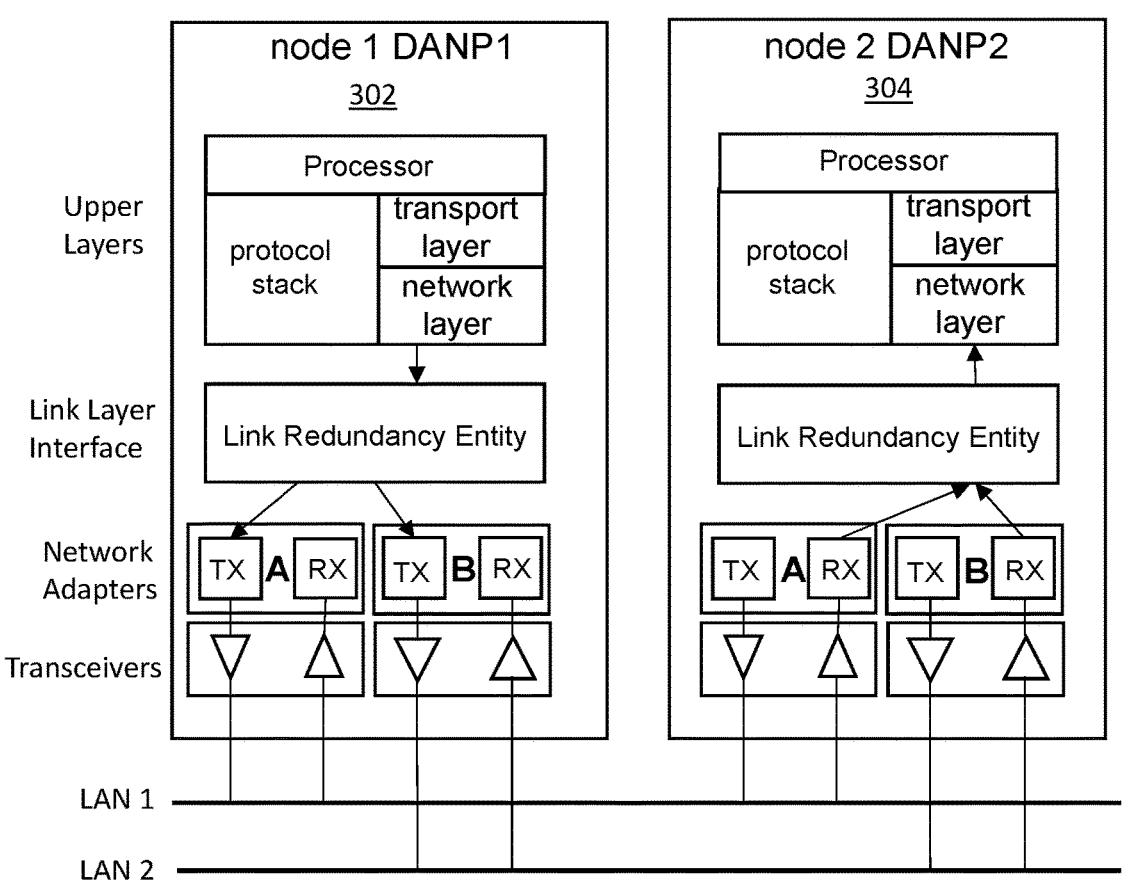
FIG. 3 illustrates an example module for implementing for implementing the parallel redundancy protocol over a pair of parallel networks.
FIG. 4 illustrates an example table representing the node MAC addresses represented by a PRP network.
FIG. 4a illustrates an example abbreviated network 1 PRP data packet frame.
FIG. 4b illustrates an example abbreviated network 2 PRP data packet frame.

FIG. 3 illustrates an example of PRP modules operating under IEC standard 62439-3. The two PRP modules include a first doubly attached node obeying to PRP (DANP1) 302 labeled in this disclosure as node 1. A second doubly attached node obeying PRP (DANP2) 304 is labeled node 2. In this example, node 1 will be used as the source node and node 2 as the destination node.

Each PRP module 302, 304 includes a processor, in the Upper Layers of modules 302 and 304 that can use any processing device including one or more processors or other processing devices that can execute an operating system instructions including a protocol stack. The protocol stack can be implemented in hypertext transfer protocol (HTTP) and may include a transmission control protocol (TCP) at a transport layer, and an IP Internet protocol (IP) at the network layer. These protocol layer examples should be considered non-limiting and are merely illustrative of the types of communication protocols which can be implemented by the protocol stack and operated by the processor of the PRP module 302-304.

The PRP modules further include TX/RX circuitry which implement the PRP-related functions described herein, as they pertain to the communication stack of the link redundancy entity (LRE) from IEC standard 62439-3. As described in IEC 62439-3, to achieve redundancy, PRP-compatible nodes are connected to two independent network LANs having similar topology, e.g., a network 1 comprised of LAN A and a second network 2 comprised of LAN B. through two independent physical ports (port A and port B). The physical ports include circuitry such as transmit (TX) and receive (RX) circuitry and transceivers for dealing with the physical connectivity of the corresponding DANP1 and DANP2 nodes.

Each pair of ports A and B for the same node share the same MAC address but operate in parallel and are attached to the same upper layers of the protocol stack, e.g., through a link redundancy entity (LRE). The LRE ensures that the upper layers are unaware of, and unaffected by, the redundancy. The LRE performs two key tasks related to the PRP-related functions described herein, the LRE handles the duplication of PRP frames and manages acceptance of the received packets from network 1 and network 2.

For example, the upper layers of the protocol stack attaches a MAC header to the data packet and converts it to an IEEE 802.3 frame, as is done in non-redundant networks. The MAC header includes a source MAC address field, a destination MAC address field, and other fields such as a tag and an Ethernet type/size field for an Ethernet frame. Normally the LRE uses the same destination MAC address for the destination within a network. The LRE duplicates the data frame received from the upper layers and appends a redundancy check trailer (RCT) to each duplicated data frame. The RCT is compliant with IEC standard 62439-3. As such, the RCT includes a sequence number field (SeqNr), a LAN identifier field (LanID), a frame size field (LSDU size) and a PRP suffix which identifies the new (appended) frame as a PRP frame.

FIG. 4 represents a simplified MAC address identifier 400 used in the example PRP network of FIG. 3. It will be appreciated that the MAC addresses in this example have been simplified for ease of explanation. As illustrated, the node 1 PRP module DANP1, includes a network 1 MAC address A1 and a network 2 MAC address A1. The node 2 PRP module, DANP2 includes a network 1 MAC address A2 and network 2 MAC address A2. It should be noted that the MAC addresses in the illustrated node identifiers node 1 and node 2, shown at FIG. 4 are the same and are identical.

The sending node LRE, in this example node 1, duplicates a packet of data for transmission in the LRE. The data packet is packaged into a frame that includes the destination MAC address, the source MAC address, the data, and the RCT. FIG. 4a shows a data packet frame 402 that will be transmitted on network 1. The MAC header identifies that the data packet source was MAC address A1 from node 1, the destination is MAC address A2 at node 2. The RCT of the frame includes the seq number and identifies that the data packet was transmitted on network 1. FIG. 4b illustrates the data packet frame 404 that is transmitted on network 2. This data packet frame includes a duplicated data packet as used in data packet frame 402 of FIG. 4a. The source MAC address is A1, and the destination MAC address is A2 and are equivalent to the source and destination addresses in data packet frame 402 even though the packet is transmitted along network 2. The LRE transfers the data packet frames to the transmitter of Port A associated with LAN 1 and the transmitter of port B associated with LAN 2.

The two PRP frames travel through LAN 1 and LAN 2 with different delays and, ideally, both reach the destination node 2. The LRE of receiving node 2 consumes the first PRP frame and discards the second one (if it arrives). The MAC address of the source node, node 1 in this example, is used to identify the received PRP frame. During the handling of duplicated PRP frames, the sequence number in the RCT is combined with the original Source MAC address and used in identifying data frame.

Figure 5:
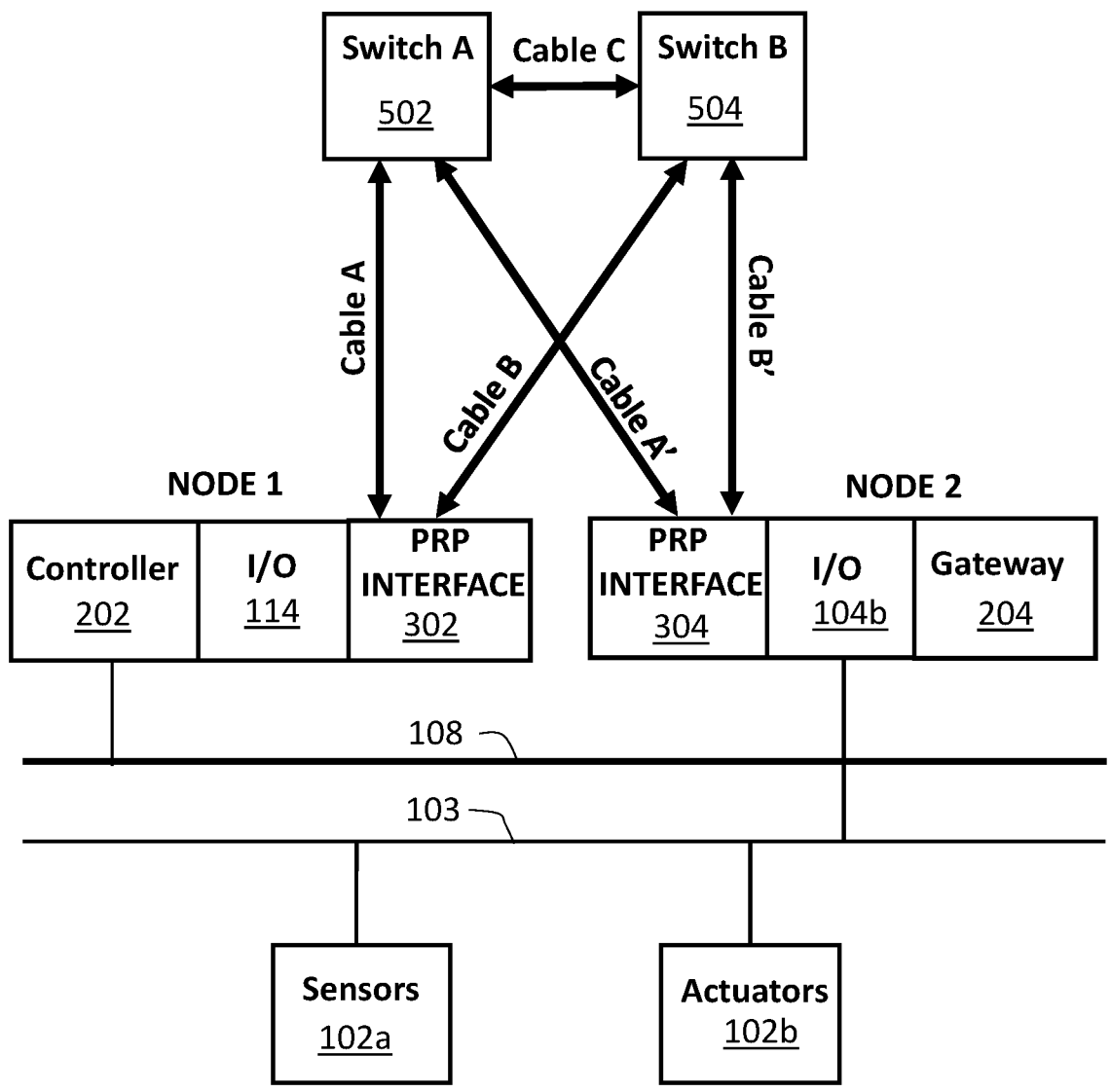
FIG. 5 illustrates an example schematic diagram of a private network for transporting data between controllers 202 and gateways 204 in accordance with the present disclosure.

FIG. 5 illustrates a private network for transporting data between controllers 202 and gateways 204 in accordance with the present disclosure. A first network node 1 is formed by controller 202, I/O module 114, and interface module 302. A second network node 2 is formed by a gateway 204, I/O module 104b and interface module 304.

Interface modules 302 and 304 are PRP modules operating under IEC standard 62439-3. The two interface modules 302-304 include a first doubly attached node obeying to PRP (DANP1) and a second doubly attached node obeying to PRP (DANP2), as explained above for FIG. 3. The controller 202 is connected to and communicates via one or more networks 108 and associated switches, firewalls, to other components of the industrial process control system. The sensors 102a and actuators 102b of this control group are connected to an I/O module 104a and 104b via one or more networks 103 and to an associated gateway 204 as was explained above. The PRP network sends data from the controller 202 of node 1 to the gateway 204 of node 2 using two independent LAN networks. For example, interface module 302 associated with network node 1 communicates using LAN network 1 (hereinafter network 1) comprised of a first cable A connected between module 302, an ethernet switch A 502 and a second cable A' connected from Ethernet switch A to interface module 304. Similarly, interface module 302 is connected to LAN network 2 (hereinafter network 2) via a first cable B to ethernet switch B 504 and second cable B' connected to interface module 304. The interface modules 302-304 through their associated ethernet switches 502-504, establish two separate networks, networks 1 and network 2, between controller 202 and gateway 204. However, unlike a classical PRP network the disclosure of the present invention includes a cable C operatively connecting ethernet switch A and switch B. Therefore, the redundant network 1 and network 2 of the present disclosure are interconnected allowing for the crossover of MAC address identifiers between networks 1 and 2.

As was explained earlier, industrial process control system vendors who manufacture devices implementing PRP as their network redundancy scheme are required to ensure that the two PRP networks are independent with no inter-connections between them. However, a failure condition exists when an inadvertent physical connection is made between these independent networks resulting in critical and catastrophic loss of communication between the devices and nodes of the industrial control system. A PRP redundancy network, although desired for high availability applications does not gracefully handle inter-connections in a switching environment. The root cause of the loss of communication is primarily due to the PRP design which duplicates and reuses the same MAC addresses for data packets transmitted on each of the independent networks. Although, PRP has a built-in design to include network information to which a packet belongs to, managed switching equipment will see the same MAC address from two different ports and report MAC flapping errors. This results in spanning tree recovery procedures incorrectly being administered. By purposefully interconnecting a PRP network in a managed switch environment and implementing the network addressing scheme of the present disclosure flapping failures can be prevented.

Figures 6, 6A, 6B, 6C, 6D:
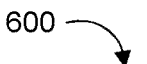
FIG. 6 illustrates an example table representing node MAC addresses in accordance with this disclosure.
FIG. 6a illustrates an example abbreviated network 1 PRP data packet frame in accordance with this disclosure.
FIG. 6b illustrates an example abbreviated network 2 PRP data packet frame in accordance with this disclosure.
FIG. 6c illustrates another example abbreviated network 1 PRP data packet frame in accordance with this disclosure.
FIG. 6d illustrates another example abbreviated network 2 PRP data packet frame in accordance with this disclosure.

The MAC addressing scheme of the present disclosure requires each PRP, in this example, PRP 302-304, build a partner MAC address table 600 that lists each of the two MAC addresses of the nodes connected to the network as shown in FIG. 6. It should be noted that the network topology may include more than two nodes, however, only two nodes will be used in this example for ease of explanation. Cable C interconnecting switch A and switch B allows each interface module 302-304 to discover and share the MAC addresses used by nodes 1 and nodes 2. Therefore, each node shares its MAC addresses with the other nodes connected in the network. Each MAC address and its partner MAC address is identified in accordance with the network it is associated with. For example, from the table 600 of FIG. 6 node 1, network 1 has a MAC address A1 and a partner MAC address B1. The node 2, network 2 has a MAC address B2 and a partner MAC address A2. Duplication of MAC addresses is not made. Each interface module 302-304 includes the partner MAC address table 600 which is used to assign the proper MAC address for data packet transmission along networks 1 and 2.

The MAC addresses contained in the MAC address table 600 is used by the PRP 302-304 to build the MAC header. For example, in the MAC header illustrated by 602 in FIG. 6a and by 604 in FIG. 6b, the protocol stack of the sending node PRP would look up the destination MAC addresses of the destination from the MAC address table and send the original data packet from source A1 to destination A2 using network 1 in accordance to frame 602. A duplicate packet would be sent to node 2 MAC address B2 from node 1 MAC address B1 along network 2 as shown in frame 604.

At the destination node PRP, for example PRP 304, consumes the first PRP frame that arrives and discards the second one (if it arrives). In the manner as earlier described for a normal PRP node. The MAC address of the source node 302 in this example, is used to identify the received PRP frame. During the handling of duplicated PRP frames, the sequence number in the RCT is combined with the original source MAC address and used in identifying the data frame.

A connected PRP network may also face some issues and may not withstand dual failures in the network. Situations of a dual fault impact communication for a connected PRP network may occur due to switch misconfigurations, or dual failures in the network from cross cables and/or faulty cables. Though these situations although very less likely to occur, it can result in critical communications disruption as networks move towards flattened networks.

Handling more than two faults on the network can be extended to the connected PRP solution to further improve network resiliency for critical applications. This can be achieved by extending the connected PRP networks packet send design to copy and send two additional packets as shown in FIGS. 6c and 6d. Hence, one application sent will result in 4 network packets shown in FIGS. 6a to 6d sent with two new packet copies shown in FIGS. 6c and 6d. The two additional packets as shown in FIGS. 6c and 6d add more robustness to the two-path solution and instead uses four-paths from the source to the target. For example, in the MAC header illustrated by 606 in FIG. 6c and by 608 in FIG. 6d, the protocol stack of the sending node PRP would look up the destination MAC addresses of the destination from the MAC address table and send another copy of the data packet from source B1 to destination A2 using network 1 in accordance to frame 606. Another copy of the data packet would be sent to node 2 MAC address B2 from node 1 MAC address A1 along network 2 as shown in frame 608.

The present disclosure provides an improved connected PRP network that provides additional resilience and can withstand dual failures in the network to ensure communication of supervisory control signals and data between the devices or nodes of a network. As shown in FIGS. 6a to 6d and discussed above, the present disclosure provides modification to a connected PRP design and allow four data packets to be generated. These additional packets over a usual connected PRP design significantly improve network resiliency and mitigates communications disruption due to multiple failures in the network caused due to human errors from switch misconfigurations or cross cabling.

Figure 7:
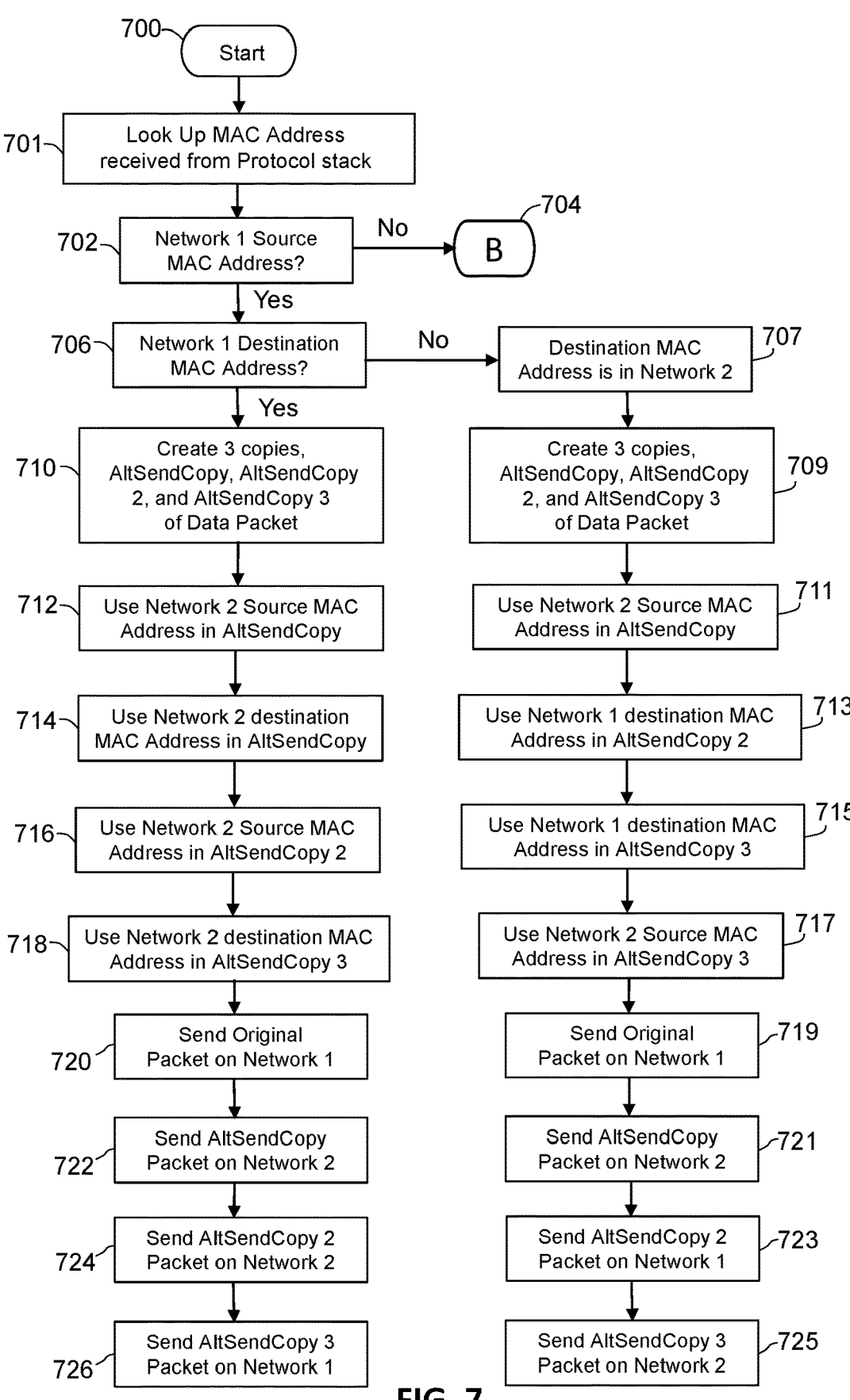
FIG. 7 illustrates a block diagram of a method for implementing the method for parallel redundancy protocol in connected networks according to this disclosure.

FIG. 7 illustrates a diagram of an example method 700 for building the PRP data packet frames 602, 604, 606, and 608 as shown in FIG. 6a to FIG. 6d respectively, according to this disclosure. For ease of explanation the method 700 is described with respect to the system 100 of FIG. 1, although the method 700 could be implemented in any other suitable system. Also, the method 700 is implemented using the controller nodes 1 and 2 of FIG. 5, although the method 700 can be implemented in any other suitable manner.

The assembly of data packet frames starts at step 701 with the source interface module looking up the source and destination MAC addresses received from the protocol stack. Next a decision step 702 is made in which the method looks to see if the source MAC address received is in network 1. If the source MAC address is in network 2 then the method branches off at step 704. If the source MAC address is in network 1, then a second decision step is made at 706 to ascertain if the destination MAC address is in network 1. If the destination is in network 1 then the method of the disclosure replaces the original MAC addresses in the following manner. In step 710 three duplicate data packet frames are created and named AltSendCopy, AltSendCopy2, and AltSendCopy3, respectively. Next at step 712, the source MAC address of the duplicate data frame AltSendCopy is replaced with the partner or Network 2 source MAC address. For this example, if the MAC address of the original data frame is A1 the partner or Network 2 MAC address from the MAC address table in FIG. 6 indicates that the partner or Network 2 MAC address is B1 and therefore in the AltSendCopy frame the source MAC address is changed to B1. Similarly, in step 714 the destination MAC address for the AltSendCopy is changed to B2 from B1. Similar steps are followed for the other two duplicate data packet frames, AltSendCopy2, and AltSendCopy3. At step 716, the source MAC address of the duplicate data frame AltSendCopy2 is replaced with the partner or Network 2 source MAC address. Next, at step 718 the destination MAC address for the AltSendCopy3 is changed with the partner or Network 2 destination MAC address.

Finally, in steps 720, 722, 724, and 726 the original data packet frame is transmitted on network 1 and the AltSendCopy data packet frame is transmitted on network 2, the AltSendCopy2 data packet frame is transmitted on network 2, and the AltSendCopy3 data packet frame is transmitted on network 1. Thereby the original data packet frame is transmitted along network 1 from MAC address A1 using a destination MAC address A2. At the same instance, the AltSendCopy data packet frame is transmitted along network 2 having source MAC address A1 using a destination MAC address A2, the AltSendCopy2 data packet frame is transmitted along network 2 having source MAC address B1 using a destination MAC address A2, and the AltSendCopy3 data packet frame is transmitted along network 1 having source MAC address A1 using a destination MAC address B2.

If however, in decision step 706, the MAC address received from the stack shows a network 2 destination MAC address then the method branches to step 707. In step 709, three duplicate data packet frames are created and named AltSendCopy, AltSendCopy2, and AltSendCopy3, respectively. In step 711, the program replaces the source MAC address of the original data packet frame to Network 2 source MAC address. For example, at step 711, the program replaces the source MAC address of the original data packet frame of B1 to A2. In step 713 the destination MAC address of the original data packet frame is replaced with the Network 1 destination MAC address. So, in step 713, the destination MAC address of the original data packet frame of B2, is replaced by the MAC address A2. Similarly, at step 715 the destination MAC address of the duplicate data frame AltSendCopy2 is replaced with the Network 1 destination MAC address. Next, at step 717 the source MAC address for the AltSendCopy3 is changed with the Network 2 source MAC address. Thereby in steps 719, 721, 723, and 725 the original data packet frame is transmitted along network 1 using a destination MAC address A2. At the same instance that the original data packet frame is transmitted on network 1, the AltSendCopy data packet frame is transmitted along network 2 using a destination MAC address A2, the AltSendCopy2 data packet frame is transmitted along network 1 having source MAC address B1 using a destination MAC address A2, and the AltSendCopy3 data packet frame is transmitted along network 2 having source MAC address A1 using a destination MAC address B2.

Figure 8:
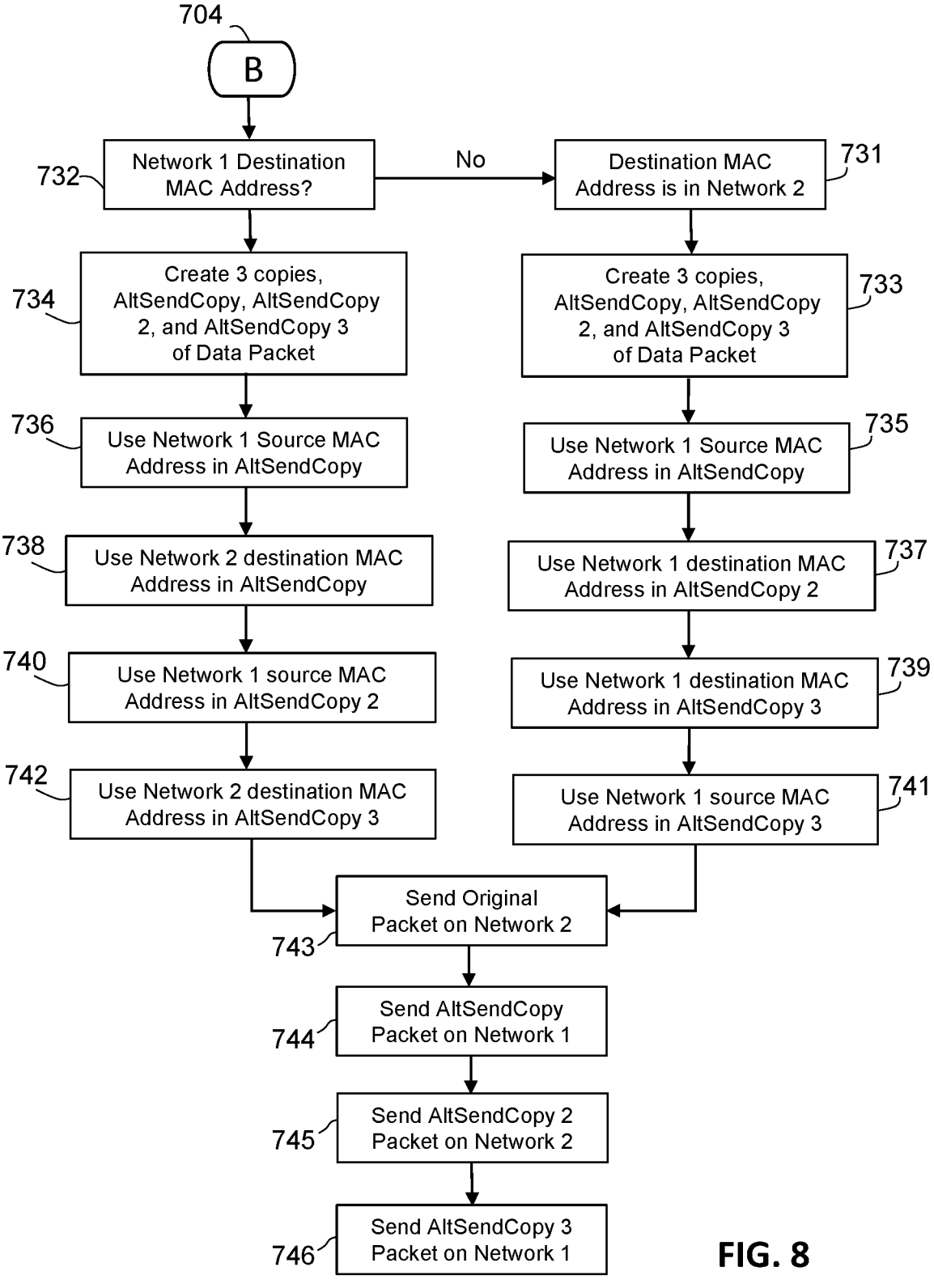
FIG. 8 illustrates a further block diagram of FIG. 7 implementing the method for parallel redundancy protocol in connected networks according to this disclosure.

FIG. 8 illustrates the method of the present disclosure wherein the method branches off at 704, due to the source MAC address originating in network 2. At decision step 732 the method looks to see if the destination MAC address is in network 1. If it is, three duplicate data packet frames are created named AltSendCopy, AltSendCopy2, and AltSendCopy3 respectively in step 734. Next in step 736 the source MAC address B2 is replaced with partner or Network 1 source MAC address A2 in the AltSendCopy. Next in step 738 the destination MAC address in original data packet frame is replaced with the partner or the Network 2 MAC address replacing it from A1 to B1. Similar steps are followed for the other two duplicate data packet frames, AltSendCopy2, and AltSendCopy3. At step 740, the source MAC address of the duplicate data frame AltSendCopy2 is replaced with the Network 1 source MAC address. Next, at step 742 the destination MAC address for the AltSendCopy3 is changed with the Network 2 destination MAC address.

In steps 743, 744, the AltSendCopy data packet frame is transmitted from source MAC address A2 in node 2 to destination MAC address A1 in node 1 over network 1. At the same instance, the original data packet frame is transmitted over network 2 using MAC address A2 to destination MAC address A1. Also, at the same instance, the other two duplicate data packet frames, AltSendCopy2, and AltSendCopy3 are transmitted over the Network 2 and Network 1 respectively. At step 745, the AltSendCopy2 data packet frame is transmitted on network 2 from source MAC address A2 to destination MAC address B1 over network 2. At step 746, the AltSendCopy3 data packet frame is transmitted on network 1 from source MAC address B2 to destination MAC address A1 over network 1.

At decision step 732 if the destination MAC address is in network 2 the conditional branch 731 is taken. At step 733, three duplicate data packet frames are created again named AltSendCopy, AltSendCopy2, and AltSendCopy3, respectively. Next in step 735 the source MAC address of the AltSendCopy data packet frame is replaced with partner or Network 1 source MAC address, A1. Next in step 737 the destination MAC address of the AltSendCopy2 is replaced with the partner or Network 1 MAC address A2. At step 739, the destination MAC address of the duplicate data packet frame AltSendCopy3 is replaced with the Network 1 destination MAC address. Next, at step 741 the source MAC address for the AltSendCopy3 is changed with the Network 1 source MAC address.

In step 743 the original data packet frame is transmitted from source MAC address A1 to destination MAC address A2 over network 2. In step 744, at the same instance, the AltSendCopy data packet frame is transmitted over network 1 using MAC address A1 to destination MAC address A2. Also, at the same instance, the other two duplicate data packet frames, AltSendCopy2, and AltSendCopy3 are transmitted over the Network 2 and Network 1 respectively. At step 745, the AltSendCopy2 data packet frame is transmitted on network 2 from source MAC address A2 to destination MAC address B1 over network 2. At step 746, the AltSendCopy3 data packet frame is transmitted on network 1 from source MAC address B2 to destination MAC address A1 over network 1.

At the destination node of each interface module 302-304, the PRP consumes the first data packet frame that arrives and discards the other copy (if it arrives). In the manner as earlier described for a normal PRP node. The network 1 MAC address has priority and is selected to replace all other incoming data packet frames. If a network 2 source MAC address arrives first, the network 1 the source MAC address is looked-up in the MAC address table and all the incoming packet source MAC addresses are replaced with the network 1 source partner MAC address.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A data communication system configured to establish independent network paths through the data communication system, wherein the data communication system comprising:

at least a first network and a second network operated in parallel;

a first node comprising a first node interface, wherein the first node interface is associated with a plurality of first network addresses; and a second node comprising a second node interface, wherein the second node interface is associated with a plurality of second network addresses, wherein the first node interface is connected to the second node interface over the first network, wherein the first node interface is connected to the second node interface over the second network, wherein when the first node interface is arranged to send data packaged in a data packet frame to the second node interface, the first node interface is configured to:

duplicate the data packet frame into a plurality of alternate data packet frames, wherein to duplicate the data packet frame into the plurality of alternate data packet frames, the first node interface is configured to:

determine if a source network address and a destination network address in the data packet frame are in the first network or the second network;

generate at least a first alternate data packet frame, a second alternate data packet frame, and a third alternate data packet frame, based on the determination that the source network address and the destination network address in the data packet frame are in the first network;

reassign a first network address of the plurality of first network addresses that corresponds to the second network as the source network address and a second network address of the plurality of second network addresses that corresponds to the second network as the destination network address for the first alternate data packet frame;

reassign another first network address of the plurality of first network addresses that corresponds to the second network as the source network address for the second alternate data packet frame;

reassign another second network address of the plurality of second network addresses that corresponds to the second network as the destination network address for the third alternate data packet frame; and send the data packet frame via the first network, the first alternate data packet frame via the second network, the second alternate data packet frame via the second network and the third alternate data packet frame via the first network.

2. The data communication system of claim 1, wherein:

the first node interface is connected to a first network switch, the first network switch connected to the second node interface over the first network; and the first node interface is connected to a second network switch, the second network switch connected to the second node interface over the second network.

3. The data communication system of claim 2, wherein the first network switch and the second network switch are interconnected, and the plurality of first network addresses and the plurality of second network addresses are communicated and shared with the second node interface and the first node interface, respectively, using the first and second network switches.

4. The data communication system of claim 3, wherein the first node interface and the second node interface decide which of the plurality of first network addresses or the plurality of second network addresses are to be used for sending and receiving data via the first network and the second network using a partner address table, the partner address table comprising the plurality of first network addresses and the plurality of second network addresses for the first node interface and the second node interface, respectively.

5. The data communication system of claim 1, wherein the first and the second node interfaces are each a doubly attached node obeying to a parallel redundant protocol standard.

6. The data communication system of claim 1, wherein each of the plurality of second network addresses is not equivalent to each of the plurality of first network addresses.

7. The data communication system of claim 1, wherein the first node interface is further configured to:

on determining the source network address in the data packet frame is the first network and the destination network address in the data packet frame is in the second network, generate at least a first alternate data packet frame, a second alternate data packet frame and a third alternate data packet frame;

reassign a first network address of the plurality of first network addresses that corresponds to the second network as the source network address for the first alternate data packet frame;

reassign a second network address of the plurality of second network addresses that corresponds to the first network as the destination network address for the second alternate data packet frame;

reassign another first network address of the plurality of first network addresses that corresponds to the second network as the source network address and another second network address of the plurality of second network addresses that corresponds to the first network as the destination network address for the third alternate data packet frame; and send the data packet frame via the first network, the first alternate data packet frame via the second network, the second alternate data packet frame via the first network and the third alternate data packet frame via the second network.

8. The data communication system of claim 1, wherein the first node interface is configured to:

on determining the source network address in the data packet frame is the second network and the destination network address in the data packet frame is in the first network, generate at least a first alternate data packet frame, a second alternate data packet frame and a third alternate data packet frame;

reassign a first network address of the plurality of first network addresses that corresponds to the first network as the source network address and a second network address of the plurality of second network addresses that corresponds to the second network as the destination network address for the first alternate data packet frame;

reassign another first network address of the plurality of first network addresses that corresponds to the first network as the source network address for the second alternate data packet frame;

reassign another second network address of the plurality of second network addresses that corresponds to the second network as the destination network address for the third alternate data packet frame; and send the data packet frame via the second network, the first alternate data packet frame via the first network, the second alternate data packet frame via the first network and the third alternate data packet frame via the second network.

9. The data communication system of claim 1, wherein the first node interface is configured to:

determine if the source network address and the destination network address in the data packet frame originate in the first network or the second network;

on determining the source network address and the destination network address in the data packet frame originate from the second network, generate at least a first alternate data packet frame, a second alternate data packet frame and a third alternate data packet frame;

reassign a first network address of the plurality of first network addresses that corresponds to the first network as the source network address and a second network address of the plurality of second network addresses that corresponds to the first network as the destination network address for the first alternate data packet frame;

reassign another second network address of the plurality of second network addresses that corresponds to the first network as the destination network address for the second alternate data packet frame;

reassign another first network address of the plurality of first network addresses that corresponds to the first network as the source network address for the third alternate data packet frame; and send the data packet frame via the second network, the first alternate data packet frame via the first network, the second alternate data packet frame via the second network and the third alternate data packet frame via the first network.

10. A method establishing independent network paths through a data communication system, the data communication system comprising at least a first network and a second network, the method comprising:

configuring a first node interface of a first node to send data packaged in a data packet frame to a second node interface of a second node, wherein the first node interface is associated with a plurality of first network addresses and the second node interface is associated with a plurality of second network addresses, and wherein the first node interface is connected to the second node interface over a first network and a second network;

duplicating, by the first node, the data packet frame into a plurality of alternate data packet frames, wherein duplicating the data packet frame into the plurality of alternate data packet frames comprises:

determining if a source network address and a destination network address in the data packet frame originate from the first network or the second network;

generating at least a first alternate data packet frame, a second alternate data packet frame and a third alternate data packet frame, based on the determination that the source network address and the destination network address in the data packet frame originate from the first network;

reassigning a first network address of the plurality of first network addresses that corresponds to the second network as the source network address and a second network address of the plurality of second network addresses that corresponds to the second network as the destination network address for the first alternate data packet frame;

reassigning another first network address of the plurality of first network addresses that corresponds to the second network as the source network address for the second alternate data packet frame;

reassigning another second network address of the plurality of second network addresses that corresponds to the second network as the destination network address for the third alternate data packet frame; and sending, by the first node interface, the data packet frame via the first network, the first alternate data packet frame via the second network, the second alternate data packet frame via the second network and the third alternate data packet frame via the first network.

11. The method of claim 10, further comprising:

connecting the first node interface to a first network switch, the first network switch connected to the second node interface over the first network; and connecting the first node interface to a second network switch, the second network switch connected to the second node interface over the second network.

12. The method of claim 11, wherein the first network switch and the second network switch are interconnected, the method further comprising:

sharing the plurality of first network addresses and the plurality of second network addresses with the second node interface and the first node interface, respectively, using the first and second network switches.

13. The method of claim 10, wherein sending, by the first node interface, the data packet frame and each of the plurality of alternate data packet frames from the first node interface to the second node interface further comprises:

deciding by the first node interface and the second node interface using a partner address table which of the plurality of first network addresses or the plurality of second network addresses are to be used for sending and receiving data via the first network or the second network, wherein the partner address table maintains the plurality of first network addresses and the plurality of second network addresses for the first node interface and the second node interface, respectively.

14. The method of claim 10, wherein each of the first and the second node interfaces operate as doubly attached nodes obeying a parallel redundant protocol standard.

15. The method of claim 10, further comprising:

on determining the source network address in the data packet frame is the first network and the destination network address in the data packet frame originate in the second network, generating at least a first alternate data packet frame, a second alternate data packet frame and a third alternate data packet frame;

reassigning a first network address of the plurality of first network addresses that corresponds to the second network as the source network address for the first alternate data packet frame;

reassigning a second network address of the plurality of second network addresses that corresponds to the first network as the destination network address for the second alternate data packet frame;

reassigning another first network address of the plurality of first network addresses that corresponds to the second network as the source network address and another second network address of the plurality of second network addresses that corresponds to the first network as the destination network address for the third alternate data packet frame; and sending the data packet frame via the first network, the first alternate data packet frame via the second network, the second alternate data packet frame via the first network and the third alternate data packet frame via the second network.

16. The method of claim 10, further comprising:

determining if the source network address and the destination network address in the data packet frame originate in the first network or the second network;

on determining the source network address in the data packet frame originates in the second network and the destination network address in the data packet frame originates in the first network, generating at least a first alternate data packet frame, a second alternate data packet frame and a third alternate data packet frame;

reassigning a first network address of the plurality of first network addresses that corresponds to the first network as the source network address and a second network address of the plurality of second network addresses that corresponds to the second network as the destination network address for the first alternate data packet frame;

reassigning another first network address of the plurality of first network addresses that corresponds to the first network as the source network address for the second alternate data packet frame;

reassigning another second network address of the plurality of second network addresses that corresponds to the second network as the destination network address for the third alternate data packet frame; and sending the data packet frame via the second network, the first alternate data packet frame via the first network, the second alternate data packet frame via the first network and the third alternate data packet frame via the second network.

17. A non-transitory computer readable medium containing instructions that when executed cause at least one processing device to:

configure a first node interface of a first node to send data packaged in a data packet frame to a second node interface of a second node, wherein the first node interface is associated with a plurality of first network addresses and the second node interface is associated with a plurality of second network addresses, and wherein the first node interface is connected to the second node interface over a first network and a second network;

duplicate, by the first node, the data packet frame into a plurality of alternate data packet frames, wherein to duplicate the data packet frame into the plurality of alternate data packet frames, the first node interface is configured to:

determine if a source network address and a destination network address in the data packet frame are in the first network or the second network;

generate at least a first alternate data packet frame, a second alternate data packet frame, and a third alternate data packet frame, based on the determination that the source network address and the destination network address in the data packet frame are in the first network;

reassign a first network address of the plurality of first network addresses that corresponds to the second network as the source network address and a second network address of the plurality of second network addresses that corresponds to the second network as the destination network address for the first alternate data packet frame;

reassign another first network address of the plurality of first network addresses that corresponds to the second network as the source network address for the second alternate data packet frame;

reassign another second network address of the plurality of second network addresses that corresponds to the second network as the destination network address for the third alternate data packet frame; and send the data packet frame via the first network, the first alternate data packet frame via the second network, the second alternate data packet frame via the second network and the third alternate data packet frame via the first network.

18. The non-transitory computer-readable medium of claim 17, wherein the plurality of alternate data packet frames comprise a first alternate data packet frame, a second alternate data packet frame and a third alternate data packet frame.

* * * * *